INVENTORS
PAUL M. KINTNER
PETER J. TOLAN

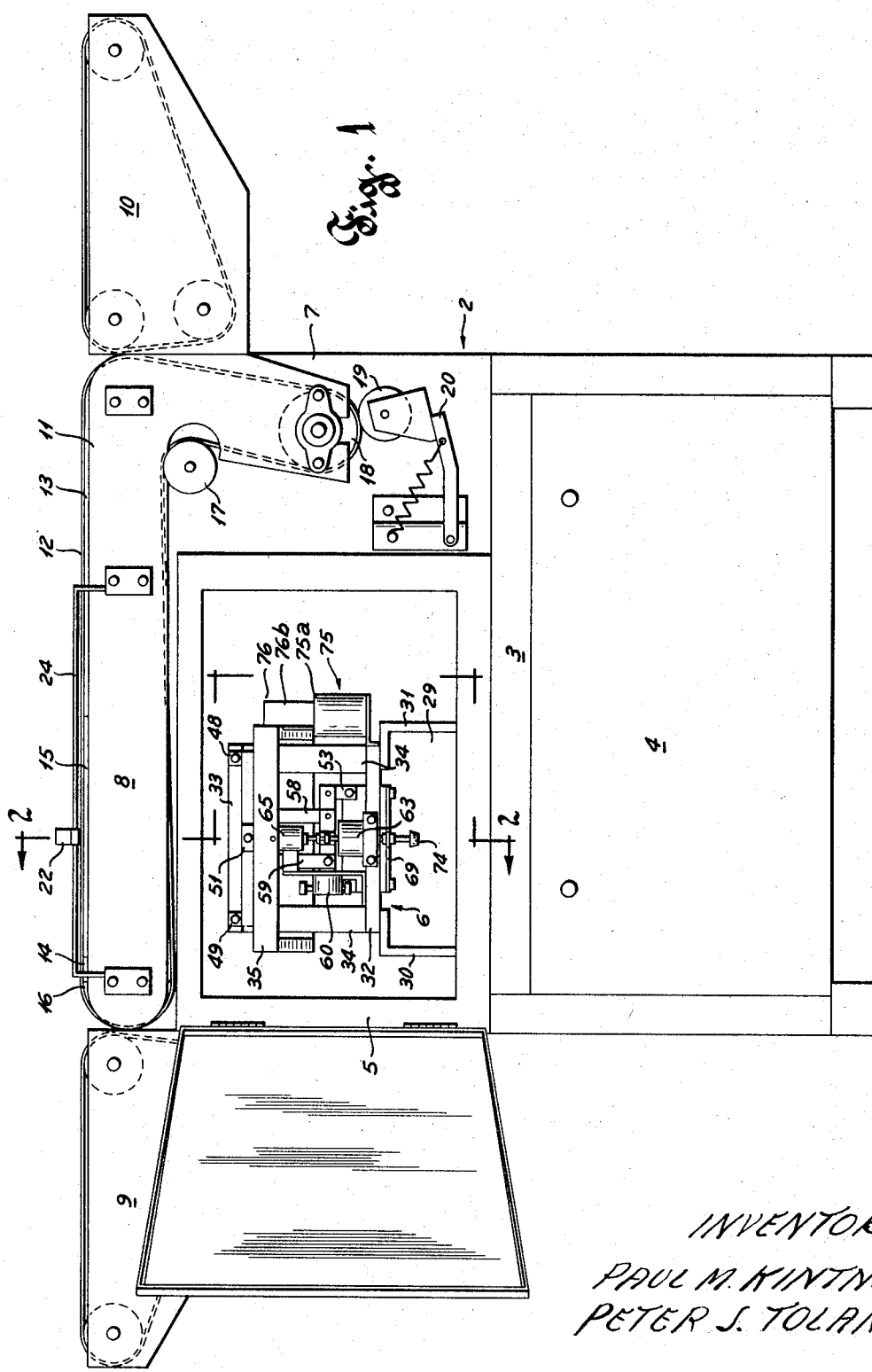

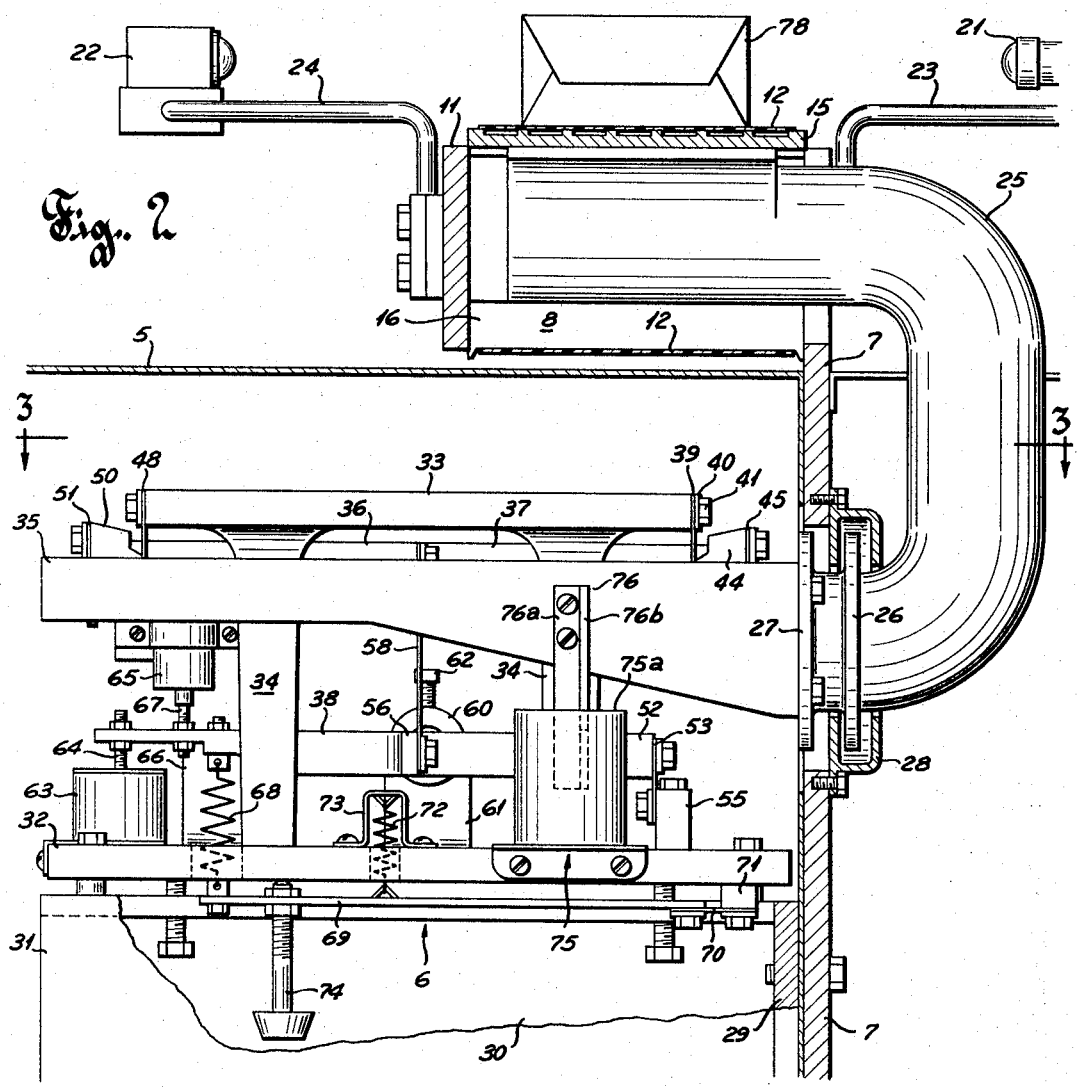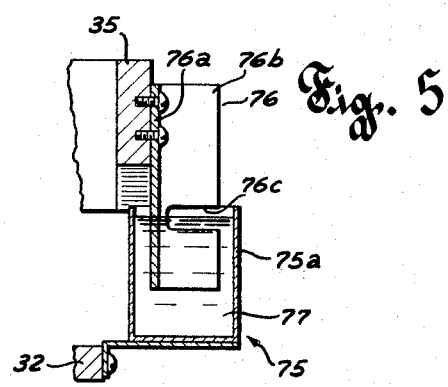

__United States Patent Office__

3,354,974
Patented Nov. 28, 1967

3,354,974
WEIGHING SCALE UTILIZING FLEXURE PLATE PIVOTS AND HORIZONTAL DAMPING
Paul M. Kintner, Huntington Station, N.Y., and Peter J. Tolan, Scituate, Mass., assignors to Cutler-Hammer, Inc., Milwaukee, Wis., a corporation of Delaware
Filed Aug. 31, 1965, Ser. No. 483,975
10 Claims. (Cl. 177—229)

ABSTRACT OF THE DISCLOSURE

A conveyor type weighing and classifying apparatus including a scale mechanism with flexure plate pivots alined to permit movement of the scale platform in a horizontal direction transverse to the conveyor and further including viscous damping means for the platform effective in that transverse direction.

---

This invention relates to weighing scales of the type utilizing vertical flexure plate pivots.

It is an object of this invention to provide a weighing scale mechanism with flexure plate pivots which is suitable for use in high speed weighing systems such as a high speed checkweighing apparatus.

It is a more specific object of this invention to provide a scale system using a plurality of parallel vertical flexure plates as pivots together with horizontal motion damping means effective in the direction of flexural freedom of the plates.

These objects are accomplished in the apparatus hereinafter disclosed by providing horizontal damping means in a highly sensitive weighing scale with parallel vertical flexure plate pivots and having low moving mass and minimal deflection under load.

Various other objects and advantages of this invention will hereinafter appear.

While the device hereinafter described is adapted to fulfill the objects stated it is to be understood that it is not intended that the invention be confined to the particular preferred embodiment disclosed since it is susceptible of various modifications without departing from the scope of the claims.

In the drawings:

FIGURE 1 is an elevational view of a checkweighing apparatus which incorporates the invention;

FIG. 2 is a fragmentary sectional view taken on line 2—2 of FIG. 1;

FIG. 5 is a fragmentary sectional view taken on line 5—5 of FIG. 3.

Figure 3:
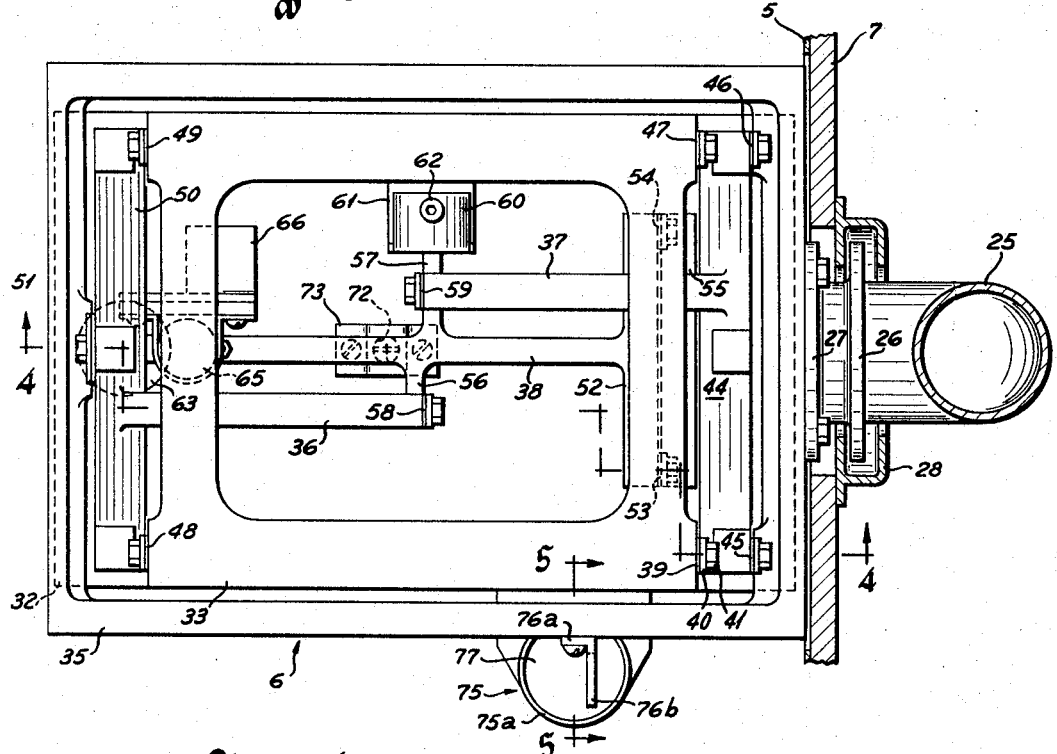
FIG. 3 is a sectional view taken on line 3—3 of FIG. 2.

Referring to the drawings, FIG. 1 illustrates a checkweigher 2 of a high speed type used in the rapid weighing of a stream of similar articles to classify such articles into groups such as overweight, underweight and acceptable.

The checkweighing apparatus shown is supported and partially enclosed by a steel cabinet 3 having a lower compartment 4 for housing a variable speed conveyor belt drive control (not shown) and an upper compartment 5 for housing a scale mechanism 6. The cabinet 3 includes a vertical mounting plate 7 which extends upwardly at the rear of compartment 5 above compartments 4 and 5 to form a supporting structure for a belt conveyor 8 and associated apparatus above compartments 4 and 5. A pair of auxiliary extending belt conveyor units 9 and 10 are fastened to the cabinet 2 in line with and at the same level as the main conveyor 8. Each of auxiliary conveyors 9 and 10 are furnished with suitable driving connections (not shown) to the source of power for the main conveyor 8.

The structure of the main conveyor 8 is supported at one side by the main mounting plate 7. An L-shaped front plate 11 is spaced apart from and parallel to the main plate 7. A movable endless belt 12 is supported therebetween. The belt 12 is supported along its upper horizontal run by three planar sections, a long forward section 13, a short aft section 14, and an intermediate weighing section 15 which functions as the movable weighing platform of scale 6. These three sections are alined to form a substantially level surface. A semi-cylindrical aft guide 16 and a similar forward guide (not shown) serve to hold and guide the belt 12 at the turns at opposite ends of its upper horizontal run. An adjustable roller 17 and a drive roller 18 complete the belt supporting means. Another roller 19 is mounted on pivoted spring biased lever 20 to press belt 12 against drive roller 18 to reduce the possibility of slippage.

A light source 21 and a photocell 22 are adjustably mounted on supporting rods 23 and 24, respectively. The photocell 22 and light source 21 are arranged on opposite sides of conveyor to signal the presence of a conveyed article upon the intermediate section 15. While the end supporting sections 14 and 13 are rigidly supported between mounting plate 7 and front plate 11, the intermediate section 15 is supported only by a roughly J-shaped tubular transition member 25. The upper arm of transition 25 is fastened rigidly to the lower surface of the intermediate section 15. The transition passes through a U-shaped cut-out portion in the upper edge of mounting plate 7 and then curves downwardly to a point where it again turns to enter an aperture in plate 7 and the rear wall of upper compartment 5. A circumferential baffle 26 is formed near the lower end of transition 25. Transition 25 terminates in a flange 27. A split circular member 28 is fastened to plate 7 to encircle baffle 26 and form a labyrinth to reduce the entry of dirt and dust through the annular opening in plate 7 around flange 27.

A V-shaped scale support comprises a rear plate 29 and a pair of parallel horizontal and forwardly extending channel beams 30 and 31 welded thereto. Plate 29 is rigidly bolted to mounting plate 7.

The scale 6 has a rectangular base plate 32 which is bolted to the upper flanges of channels 30 and 31. A rectangular main frame 33 with four legs 34 rests on base plate 32. The lower end of edge leg 34 is fastened to plate 32. The movable structure of scale 6 includes a rectangular open centered platform 35 which surrounds the upper portion of the scale 6. The flange 27 of transition member 25 is securely fastened to the right edge (FIGS. 2, 3 and 4) of platform 35. The leverage system of the scale comprises two substantially similar T-shaped upper levers 36 and 37 and a lower main lever or beam 38.

Figure 4:
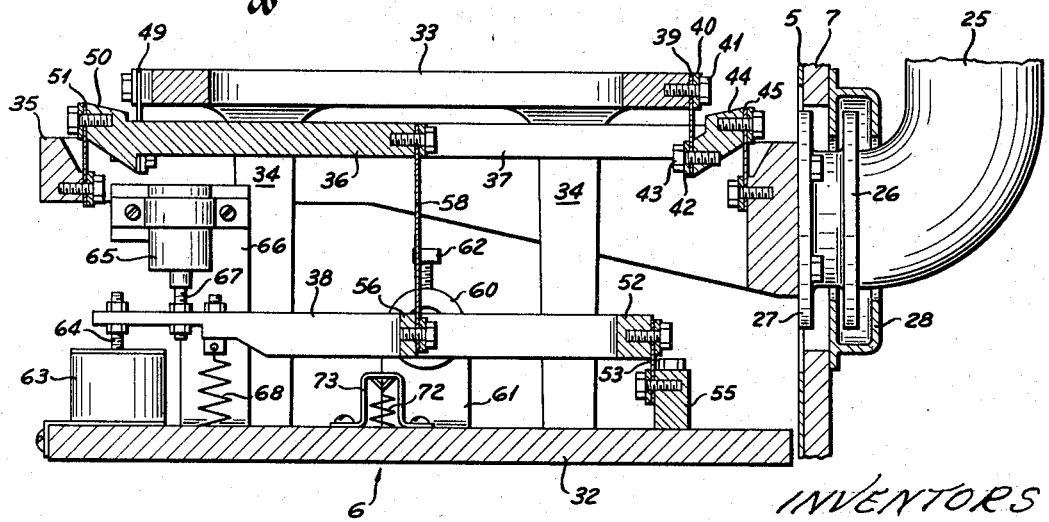
FIG. 4 is a sectional view taken on line 4—4 of FIG. 3.

The platform 35 and the levers 36, 37 and 38 are suspended by pivoted joints of the flexure plate type best illustrated in FIG. 4. For instance, in FIG. 4 at the right-hand side of main frame 33, there is shown one of the flexure plate couples whereby lever 37 is suspended from frame 33 and platform 35 is suspended from lever 37. A flexure plate 39 consisting of a thin strip of metal is fastened to the outer edge of frame 33 by a rectangular washer or pad 40 and a machine screw 41. At its lower end, flexure plate 39 is similarly fastened by pad 42 and machine screw 43 to the left edge of the crosspiece 44 of lever 37.

Another flexure plate 45 is fastened at its upper end to the rightmost edge of crosspiece 44 and at its lower end to the inner edge of platform 35. At the opposite end of crosspiece 44, platform 35 is suspended from crosspiece 44 by a flexure plate 46, and crosspiece 44 is suspended from main frame 33 by flexure plate 47. At the opposite side of frame 33, lever 36 is similarly suspended therefrom by a pair of flexure plates 48 and 49, which are fastened near the opposite ends of a crosspiece 50 of lever 36 at the right edge thereof (see FIGS. 3 and 4). Platform 35 is suspended at its left side from lever 36 by a single flexure plate 51 fastened to crosspiece 50 near its center. Platform 35 therefore is provided with three point suspension by flexure plates 45, 46 and 51.

The main lever 38 has a crosspiece 52 at one end. A pair of flexure plates 53 and 54 are attached to opposite ends of the crosspiece 52 and are further attached to a fulcrum block 55 which is secured to the scale base 32. Near the midpoint of main lever 38, there are two opposite horizontal transverse extensions 56 and 57. Extension 56 serves as a fastening point for a relatively long flexure plate 58 which connects extension 56 with the end of lever 36 directly above. Similarly, another flexure plate 59 connects extension 57 to the end of the arm of lever 37. Extension 57 further extends to within the open center of a cylindrical beam stop 60. A plate 61 holds the beam stop 60 in position and is fastened to base 32. A set screw 62 serves as an adjustable upper limit in the beam stop assembly. The function of the beam stop 60 is to provide upper and lower limits to the vertical movement of main lever 38.

An oil filled vertical dashpot 63 is fastened to base 32 under the movable end of lever 38. A vertically movable plunger rod 64 is fastened to the end of lever 38 to provide damping of the vertical movements of lever 38. An apparatus of any well known type for measuring small movements such as a linear variable differential transformer 65 is mounted above lever 38 on bracket 66 which is in turn fastened to base 32. The vertically movable plunger rod 67 of linear variable differential transformer 65 is fastened near the movable end of lever 38. The output of transformer 65 indicates the position of lever 38 and therefore provides a useful indication of the weight on the scale.

A beam loading tension range spring 68 is also fastened to main lever or beam 38 and extends downwardly through an aperture in base 32 to be fastened at its other end to a range spring adjustment lever 69. This adjustment lever 69 is pivoted at its other end with a flexure plate 70 fastened to a fulcrum block 71. Another tension spring 72 is fastened to lever 69 and passes through an aperture in base 32 to be suspended from a bracket 73. This spring exerts an upward force on lever 69. An adjusting screw 74 mounted in an aperture in lever 69 and having its upper end bearing against the lower surface of base 32 may be turned to either allow the lever to rise or to lower lever 69 against the tension of spring 72 to thereby adjust the tension of spring 68 and selectably adjust the operating range of the scale.

Damping means for horizontal movements of platform 35 is provided by motion dampening means 75, the cup 75a of which is fastened to base 32. An L-shaped angle 76 having a shorter leg 76a and a longer leg 76b is fastened to the edge of platform 35. As best shown in FIG. 5, angle 76 extends downwardly through open top of cup 75a into the liquid 77 which fills cup 75a. The liquid 77 is preferably a "Silicone" fluid having a viscosity of approximately 1,000,000 centistokes.

A cut-out portion 76c is provided in leg 76b at the liquid surface level to reduce the length of the intersection of the angle 76 with the surface of liquid 77 to thereby reduce the effects of surface tension. Any tendency toward hysteresis in the horizontal movements of the system is consequently reduced. The choice of a "Silicone" fluid of a viscosity in the 1,000,000 centistoke range prevents the type of fluid flow around angle 76 as would occur around the paddle of the usual dashpot. This relatively high viscosity results in the apparent stiffness of the system to rapid vibratory movement in the otherwise vulnerable direction.

The operation of the weighing system will now be explained. When a conveyed article such as a package 78 as shown in FIG. 2, is conveyed upon the moving belt 12 to a position upon the weighing section 15, the weight of package 78 is transmitted through the transition member 25 to the platform 35 of scale 6 to cause a slight downward movement thereof. The force due to the weight of package 78, is transferred through flexure plate 51 to lever 36 and through flexure plates 45 and 46 to lever 37. Each of levers 36 and 37 functions as a lever of the first kind. The fulcrum of lever 36 is furnished by flexure plates 48 and 49 while flexure plates 39 and 47 serve as the fulcrum of lever 37. Since plates 58 and 59 are fastened to the longer arms of levers 36 and 37, respectively, the upward movements thereof are amplifications of the downward deflection of platform 35. The movements of flexure plates 58 and 59 are transmitted to the extensions 56 and 57 near the mid-point of lever 38. Lever 38 functions as a lever of the third kind with its fulcrum at flexure plates 53 and 54. Lever 38 further amplifies the movements of flexure plates 58 and 59 to operate the plunger 67 of linear variable differential transformer 65 which is attached to lever 38 near its free end. The amplification of movement through the entire lever system might preferably be ten to one so that a load on section 15 would typically produce a deflection of .002 inch at section 15 and platform 35 and a movement of .020 inch at plunger 67 of differential transformer 65, against the tension of spring 68. With this relatively small movement under load, section 15 remains substantially in line with sections 13 and 14 to thereby minimize the effects of belt 12 on the accuracy of weighing.

Upon the removal of the load from section 15, spring 68 quickly restores the mechanism to its position of unloaded equilibrium. Dashpot 63 dampens the vertical movements of lever 38 to reduce vibrations and oscillations so that the mechanism may rapidly reach stable equilibrium at the position corresponding to whatever load is present. Most of the moving load supporting elements of the weighing system including section 15, transition 25, platform 35 and levers 36, 37 and 38 are constructed of aluminum to thereby minimize the mass of the moving parts and reduce the time needed for the attainment of equilibrium.

It is to be noted that all of the flexure plates 39, 47, 45, 46, 48, 49, 51, 58, 59, 53 and 54 in the platform suspending and leverage systems are arranged in parallel vertical planes. In addition to the lack of friction in flexure plate pivots and simplicity of construction, this type of arrangement of flexure plates has the benefit of stability of the position of pivot points during normal movement of the lever systems to thereby provide precise definition of lever rating over the full range of loading and movement. Further, this pivot using a single flexure plate has an advantage over multiple plate pivots in that fewer plates result in less spring rate and therefore higher sensitivity. However, this arrangement of flexure plates introduces a direction of freedom of horizontal movement of the platform 35 and the levers of the system, particularly levers 36 and 37. This horizontal direction of freedom of movement results from the fact that all of the flexure plates suspending any particular member flex in the same direction. Referring for example, to FIG. 4, all of the flexure plates connected to platform 35 and levers 36 and 37 will flex in a direction so that platform 35 and levers 36 and 37 can be moved horizontally from left to right and vice versa. This freedom of movement is unnecessary and unwanted in that it introduces the possibility of horizontal transverse vibration in the mechanism caused by rapid conveyance of articles across section 15 by belt 12. Such horizontal vibrations and consequent vertical vibration in lever 38 can, in the absence of vibration dampener 75, develop to such an extent that they will be sensed by differential transformer 65. The presence of such vibrations can therefore significantly and adversely affect the accuracy of weight measurement and render this type of scale mechanism unsuitable for use in a high speed checkweighing system.

Vibration dampener 75 serves to dampen horizontal movement of platform 35 in the direction of flexural freedom of the flexure plate pivots since the plane of the larger leg 76b of angle 76 is alined perpendicular to the direction of such movement. The movement of angle 76 within the cup is impeded by the liquid contained therein and substantially in proportion to the viscosity of such liquid.

The inclusion of the horizontal vibration dampener 75 was found to significantly reduce the unwanted vibration without adversely affecting the intrinsic high accuracy of the flexure plate system. This type of flexure plate scale was thereby made suitable for use in very high speed checkweighing applications for which this system is intended.

We claim:
1. A weighing scale comprising:
   (a) a platform means for supporting a load to be weighed;
   (b) means for supporting said platform means including means for allowing vertical deflection of said platform means substantially in proportion to the load carried thereby;
   (c) a plurality of pivots comprising flexure plates for connecting said platform means to said means for supporting said platform means;
   (d) said flexure plates being alined in substantially parallel vertical planes to have a common horizontal direction of flexural freedom to allow horizontal movement of said platform means in a direction normal to said vertical planes; and
   (e) viscous damping means for damping horizontal movement of said platform means in said normal direction.

2. The invention as defined in claim 1, in which said viscous damping means comprises a stationary liquid filled container and a member fastened to said platform means and suspended in said liquid.

3. The invention as defined in claim 2 in which said member has a reduced cross section at the upper surface of said liquid.

4. The invention as defined in claim 2, in which said liquid has a viscosity of approximately 1,000,000 centistokes.

5. A scale adapted for weighing moving articles upon a section of a conveyor comprising, in combination:
   (a) platform means for supporting a section of a conveyor upon which articles are conveyed;
   (b) means for supporting said platform means including means for allowing vertical deflection of said platform means substantially in proportion to the load carried thereby;
   (c) a plurality of pivots comprising flexure plates for connecting said platform means to said means for supporting said platform means;
   (d) said flexure plates being alined in substantially parallel vertical planes to have a common horizontal direction of flexural freedom to allow horizontal movement of said platform means in a direction transverse to the direction of movement of said articles; and
   (e) viscous damping means for damping horizontal movement of said platform means in said transverse direction.

6. The invention as defined in claim 5, in which said viscous damping means comprises a stationary liquid filled container and a member fastened to said platform means and suspended in said liquid.

7. A scale adapted for weighing moving articles upon a section of a conveyor comprising, in combination:
   (a) platform means for supporting a section of a conveyor upon which articles are conveyed;
   (b) means including at least one pivotally mounted lever for supporting said platform means and for allowing vertical deflection of said platform means substantially in proportion to the load carried thereby;
   (c) a plurality of pivots comprising flexure plates for connecting said platform means to said lever and for suspending said lever;
   (d) said flexure plates being alined in substantially parallel vertical planes to have a common horizontal direction of flexural freedom to allow horizontal movement of said platform means and said lever in a direction transverse to the direction of movement of said articles; and
   (e) viscous damping means for damping horizontal movement of said platform means in said transverse direction.

8. The invention as defined in claim 7, in which said viscous damping means comprises a stationary liquid filled container and a member fastened to said platform means and suspended in said liquid.

9. A high speed checkweighing system comprising, in combination:
   (a) an article conveyor including a section upon which conveyed articles are weighed; and
   (b) a weighing scale comprising:
      (1) platform means for supporting said section;
      (2) means for supporting said platform means including means for allowing vertical deflection of said platform means substantially in proportion to the load carried by said section;
      (3) a plurality of pivots comprising flexure plates for connecting said platform means to said means for supporting said platform means;
      (4) said flexure plates being alined in substantially parallel vertical planes to have a common horizontal direction of flexural freedom to allow horizontal movement of said platform means in a direction transverse to the direction of movement of conveyed articles upon said section; and
      (5) viscous damping means for damping horizontal movement of said platform means in said transverse direction.

10. The invention as defined in claim 9, in which said viscous damping means comprises a stationary liquid filled container and a member fastened to said platform means and suspended in said liquid.

References Cited

UNITED STATES PATENTS

| | | | |
|---|---|---|---|
| 3,017,992 | 1/1962 | Matti | 177—16 X |
| 3,148,742 | 9/1964 | Giulie | 177—229 X |

FOREIGN PATENTS

| | | |
|---|---|---|
| 397,522 | 8/1933 | Great Britain. |

RICHARD B. WILKINSON, *Primary Examiner.*

GEORGE H. MILLER, *Assistant Examiner.*